Sept. 21, 1965  C. R. HOOD ETAL  3,207,651
APPARATUS FOR MAKING TUBING FROM A CONTINUOUS WEB
Filed July 13, 1961  5 Sheets-Sheet 2

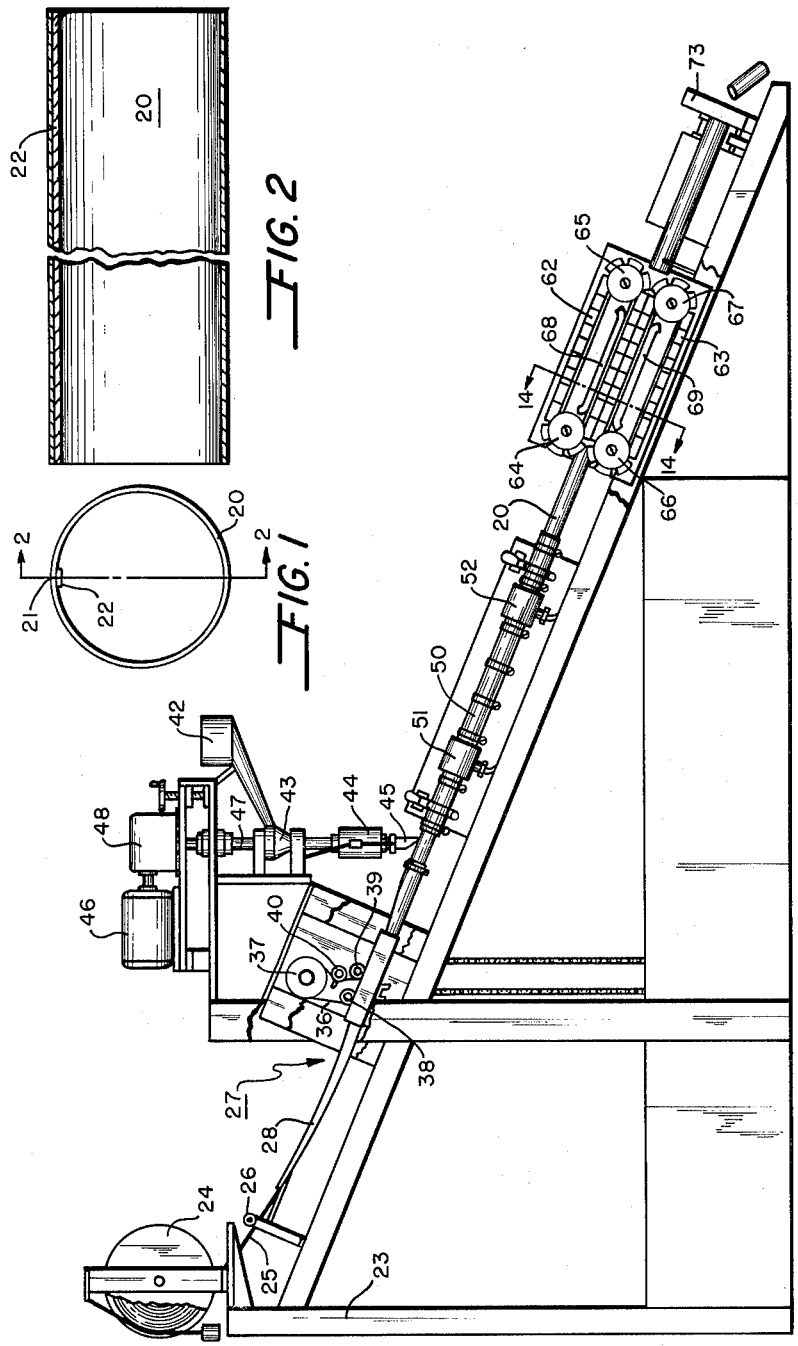

INVENTORS
CHARLES R. HOOD
JEAN E. SCHAEFER
BY
Fredrick H. Braun
ATTORNEY

Sept. 21, 1965 C. R. HOOD ETAL 3,207,651
APPARATUS FOR MAKING TUBING FROM A CONTINUOUS WEB
Filed July 13, 1961 5 Sheets-Sheet 3

INVENTORS
CHARLES R. HOOD
BY JEAN E. SCHAEFER
Fredrick H. Braun
ATTORNEY

INVENTORS
CHARLES R. HOOD
JEAN E. SCHAEFER
BY
Frederick H. Braun
ATTORNEY

Sept. 21, 1965  C. R. HOOD ETAL  3,207,651
APPARATUS FOR MAKING TUBING FROM A CONTINUOUS WEB
Filed July 13, 1961  5 Sheets-Sheet 5

INVENTORS
CHARLES R. HOOD
JEAN E. SCHAEFER
BY
*Fredrick H. Braun*
ATTORNEY

United States Patent Office

3,207,651
Patented Sept. 21, 1965

---

3,207,651
APPARATUS FOR MAKING TUBING FROM A CONTINUOUS WEB
Charles R. Hood, Springfield Township, Hamilton County, and Jean E. Schaefer, Colerain Township, Hamilton County, Ohio, assignors to The Procter & Gamble Company, Cincinnati, Ohio, a corporation of Ohio
Filed July 13, 1961, Ser. No. 123,837
4 Claims. (Cl. 156—466)

This invention relates to an apparatus and method for continuously fabricating tubing from a web of flat stock or sheet material. In particular, the invention contemplates forming a web of material into an enclosed tube in which the edges of the web are in abutment and seaming the abutting edges by overlaying a filament of thermoplastic material on the inside edges of the butt joint.

Nearly everyone is familiar with conventional collapsible tubes which are used almost universally for packaging such products as toothpaste, shaving cream, shampoo and many others. Such tubes are usually impact extruded from a slug of metal after which the tube is decorated, capped, filled and sealed. For many years there have been attempts to replace these metal tubes with plastic tubes or foil tubes or foil laminated tubes manufactured by any number of other methods. Most of these attempts have been futile because plastic materials do not provide adequate moisture, flavor and aroma barriers. On the other hand, foil tubes are subject to corrosive attack due to the chemical composition of the majority of commercially packaged products. Thus, far, it has been impossible to form collapsible tubes from foil with proper internal plastic coatings since such laminated products can not be extruded in tube form and coating the foil after the tube is formed has many practical limitations. Therefore, the answer to these problems has been to form a tube from a plastic and metal foil laminated material which has an internal layer of plastic to resist chemical attack; the metal foil serves to prevent loss of moisture, flavor and aroma from the finished tube.

The principal object of this invention is to continuously form a tube from a web of laminated plastic and metal foil sheet stock. The tube so formed can be used to fabricate a collapsible tube having all of the essential requisites of packages of the collapsible tube type.

Another object of this invention is the provision of a method and apparatus for continuously making tubes from a web of laminated plastic and foil material in straight line fashion at high speeds and with maximum operating efficiencies.

Yet another object of the invention is to reduce the cost of manufacturing collapsible tubes by providing a method and apparatus for forming tubes from a laminated plastic and metal foil material in which the foil material can be completely printed and decorated before being formed into a tube at much less expense than normally incurred in decorating conventional collapsible tubes.

Still another object of the invention is the provision of an apparatus and method for forming tubing from sheet material wherein the edges of the sheet material are butt-seamed in a non-lapped joint inside the tubing in order not to interfere with the appearance of the finished package.

Still a further object of the invention is the provision of an apparatus and method in which the edges of a laminated sheet are butt-seamed by an internal filament of thermoplastic material without sacrificing strength and while at the same time protecting the contents of the tube from the metallic edge of the tube material.

Briefly stated, in accordance with one aspect of the invention, an apparatus and method are provided in which a continuous web of plastic laminated foil material is formed from a flat condition into substantially cylindrical tubing by the use of appropriate forming means; the edges of the formed tubing are held in abutting relation; an extruded filament of molten thermoplastic material is fed between the edges of the formed web at a point upstream of where the edges come into abutment; the filament is moved along with the web at about the same speed and is gradually moved toward the abutting edges until it contacts the abutting edges on the inside of the tubing; the filament is held against the butt joint of the tubing as it moves with the tubing after which it is immersed in a cooling water bath maintained within the tubing; a pair of draw belts are provided to pull the tubing and web through the machine continuously; the tubing is filled with water at the area of contact with the draw belts in order to provide a reasonably firm cylinder which can be gripped by the draw belts; the finished tubing can be cut into short lengths in registry with any printed matter which may appear on its outer surface by a conventional cutter device.

While the specification concludes with claim particularly pointing out and distinctly claiming the subject matter regarded as forming the present invention, it is believed the invention will be better understood from the following description taken in connection with the accompanying drawings in which:

FIGURE 1 is an end elevation of the finished tubing produced by the present method and apparatus;

FIGURE 2 is a longitudinal section of a cut length of the finished tubing taken along the line 2—2 of FIGURE 1;

FIGURE 3 is a side elevation, partially broken away, of the entire apparatus for forming the tubing;

The invention will now be described in forming tubing from a web of flat stock. The flat stock can be a foil material such as aluminum, tin or the like which is coated on one or both surfaces. The surface which is to form the inside of the tubing is coated with an outer layer of polyethylene, nylon or other heat sealable material. An intermediate layer may be used selected from the group consisting of polyethylene, acetate, polyethylene terephthalate, nylon or any derivates of any of them. The surface which is to become the outside surface of the tubing can either be free of any coating material or it can be coated with a material selected from the group consisting of polyethylene, acetate, polyethylene terephthalate, nylon or any derivatives of any of them. Coating on the outside surface may be desirable to protect printed matter on the foil surface as well as to increase the total wall thickness of the stock. The outer layer on the inside of the tubing is heat sealable so that it will bond properly with the thermoplastic filament which is of the same or a similar material as the outer layer of material on the inside of the tubing. It is to be understood that other laminated materials or even unlaminated materials can be efficiently and effectively manipulated by the present apparatus and method. The composition of the material being formed, in other words, in no way forms a limitation on the invention.

Referring to FIGURES 1 and 2, the finished product made by the invention is illustrated. The tubing 20 has a butt joint at 21 which is sealed by the internal bead 22. FIGURE 2 shows a length of tubing 20 after it has been formed and cut. This tubing is useful in forming a collapsible tube by the method and apparatus described and claimed in the copending application of Charles R. Hood et al., Serial No. 123,862, filed July 13, 1961, which issued as U.S. Patent 3,128,215 on April 7, 1964 and is entitled Method and Apparatus for Sealing a Thermoplastic Top to a Tubular Body. The latter application is also assigned to the same assignee as the present application.

Figure 4:
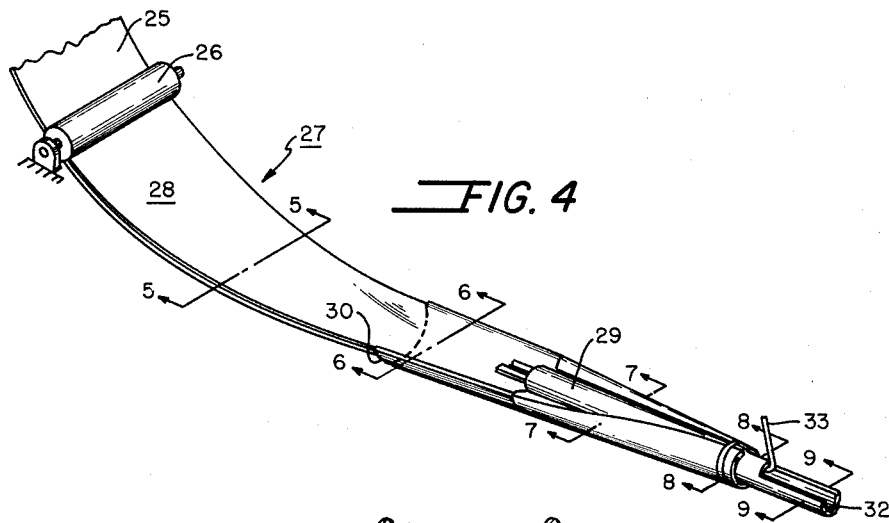
FIGURE 4 is a fragmentary perspective view of the outer mandrel for forming the web material into a round form.
Figure 5:
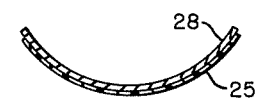
FIGURE 5 is a cross section of the mandrel taken along the line 5—5 of FIGURE 4.
Figure 6:
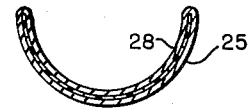
FIGURE 6 is a cross section of the mandrel taken along the line 6—6 of FIGURE 4.

Referring now to FIGURE 3, the machine frame 23 is shown supporting the various operating components which will be described in greater detail hereinafter. A supply roll 24 of the laminated web 25 is mounted on the frame 23 as shown. The web 25 is withdrawn under the free roller 26 and is then formed into a tube as it is continuously moved over the outer mandrel shown generally at 27 in FIGURES 3 and 4.

Figure 7:
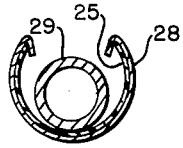
FIGURE 7 is a cross section of the outer and inner mandrels taken along the line 7—7 of FIGURE 4.
Figure 8:
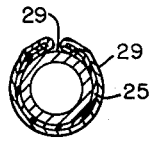
FIGURE 8 is another cross section of the outer and inner mandrels taken along the line 8—8 of FIGURE 4.

The outer mandrel shown specifically at 28 forms the flat laminated web 25 into tubular form due to changes in its contour. The manner in which the web is formed into a tube will be better appreciated by referring to the progressive cross sections of the outer mandrel 28 as seen in FIGURES 5, 6, 7 and 8. FIGURES 7 and 8 also show the internal forming mandrel 29 which guides the internal surface of the web after the formation of the tubing has been almost finished. It will be noted that the outer mandrel 28 is open initially and then is closed beginning at 30 in FIGURE 4. This will also be appreciated by comparing FIGURES 5 and 6. When the web reaches the internal mandrel 29, the outer mandrel 28 is again open and the internal mandrel 29 provides the internal support as the tubing continues to be formed.

Figure 9:
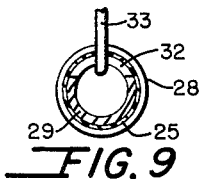
FIGURE 9 is a cross section of the inner mandrel taken along the line 9—9 of FIGURE 4.
Figure 10:
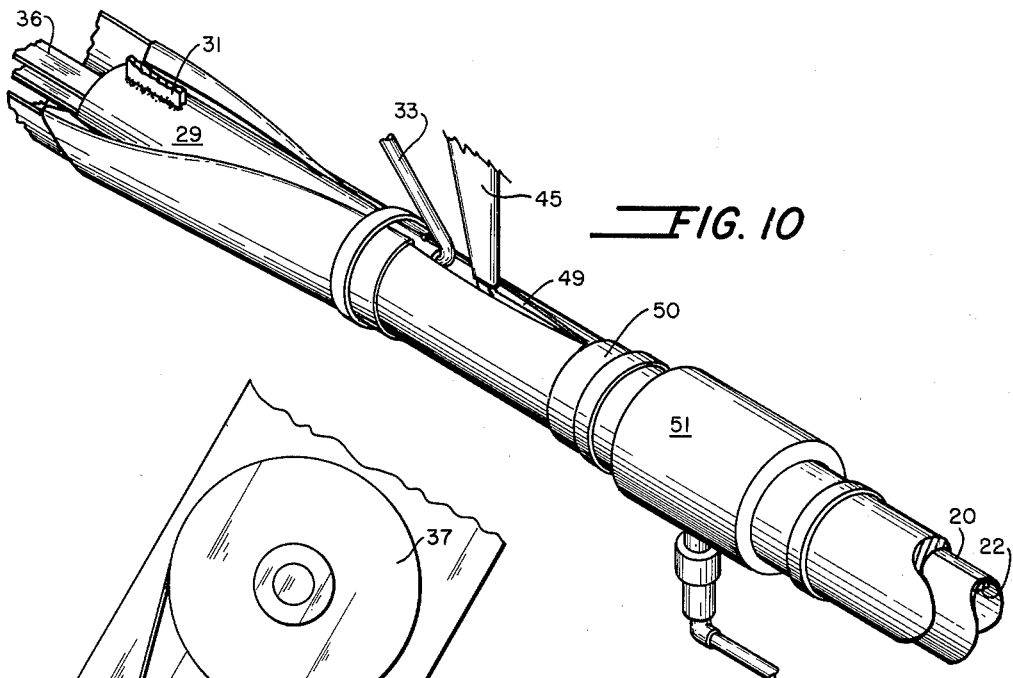
FIGURE 10 is a fragmentary perspective view, partially broken away, showing the forming mandrels and the forming sleeve.
Figure 11:
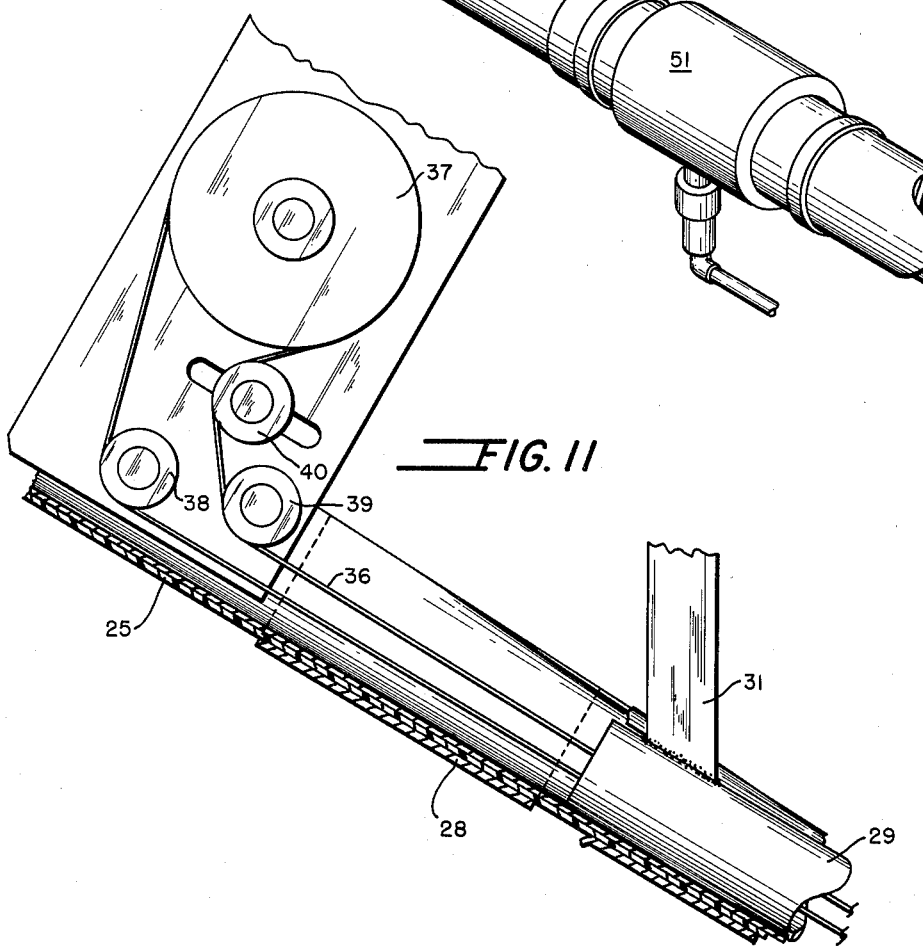
FIGURE 11 is a fragmentary elevation, partially broken away of the drive pulley and idler pulleys for the belt carrying the thermoplastic filament.

The internal forming mandrel 29 is supported on the machine frame 23 by a brace 31 (FIGURES 10 and 11). It will be noted by viewing FIGURES 4, 9 and 12 that the internal mandrel 29 has a portion of its surface cut away as at 32 and is also supported by the hook 33 which attaches to the machine frame 23. A stationary guide block 34 and a pulley 35 are provided inside the internal mandrel 29 at its lower end. The pulley 35 supports a narrow endless metal belt 36 inside the internal mandrel. As seen in FIGURE 11, the metal belt 36 is driven by a rubber roll 37 and is guided over the idlers 38, 39 and 40. The idler 41 (FIGURE 12) is mounted inside the internal mandrel 29.

Means are provided for extruding a molten filament of thermoplastic material and depositing it on the belt 36. Referring again to FIGURE 3, the thermoplastic material (e.g. polyethylene or the like) is put in the hopper 42 where it is gravity fed to the cup 43. From the cup 43 the thermoplastic material is driven through the barrel 44 by a conventional extruder screw (not shown) which is rotated by a motor 46 driving a shaft 47 from the gear box 48. The thermoplastic material is heated by conventional means and is expelled through the nozzle 45 as a thin filament 49. The relative position of the extrusion nozzle 45 to the belt 36 is seen in FIGURE 12 where the ribbon or filament 49 of the thermoplastic material is shown flowing onto the belt 36.

A sleeve 50 surrounds the lower end of the internal mandrel 29 and acts as an external forming device for the tubing. The sleeve 50 is provided (see FIGURES 3, 10 and 12) with water manifolds 51 and 52 which feed water into the sleeve at low pressure in order to provide a liquid lubricating film between the tubing 20 and sleeve 50.

Cooling water is provided inside the tubing 20 in order to chill the welded joint and to keep the tubing "inflated" in the form of a reasonably firm cylinder. A flat water tube 53 (FIGURE 12) extending from a suitable source and passing inside the internal mandrel 29 supplies water to the manifold 54. A support 55 may be used to secure the manifold 54 to the mandrel 29. A length of tubing 56 is attached to the manifold 54 to supply water inside the tubing 20 by means of the openings 57. As seen in FIGURE 13, the tubing 56 terminates in a metal funnel 58 and a flexible water seal or dam 59. The feather edge 60 of the water dam 59 touches lightly on the internal surface of the tubing 20 and permits some water to flow through and lubricate this seal. Due to the water lost, fresh water is constantly being supplied inside the tubing.

Figure 12:
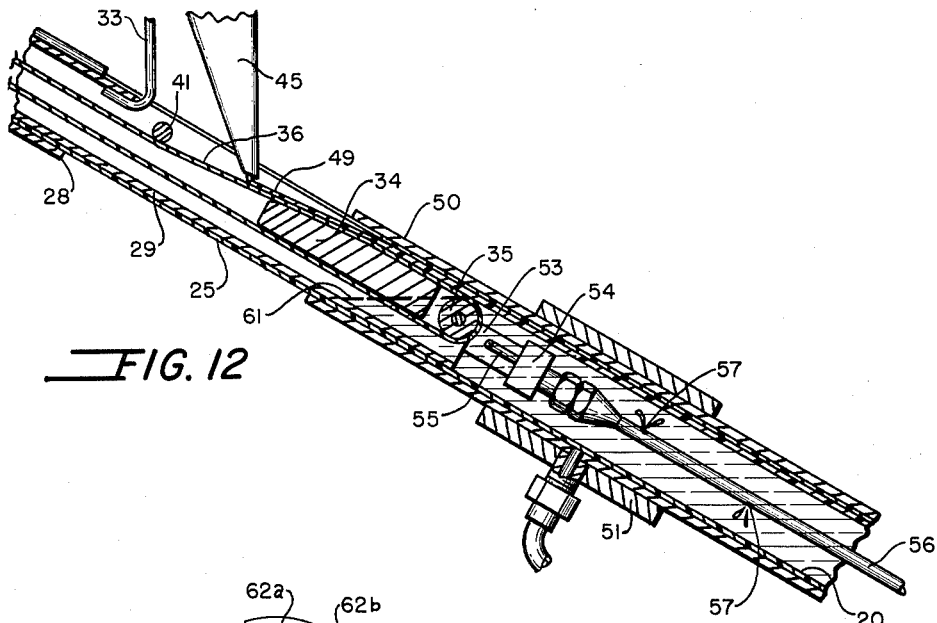
FIGURE 12 is a fragmentary longitudinal section, of the extrusion head and the sleeve showing the means for carrying the thermoplastic filament to the butt joint.
Figure 13:
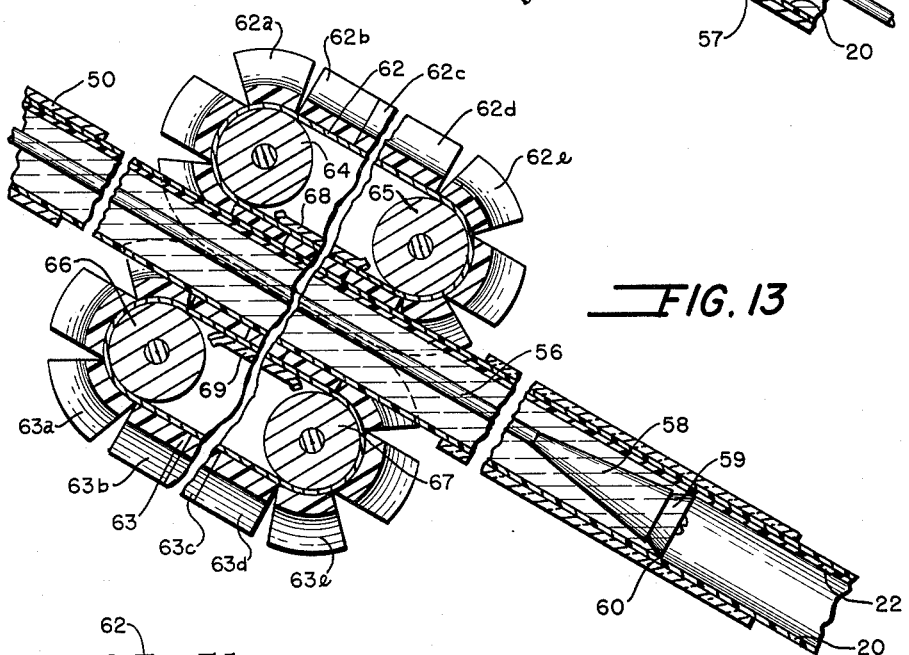
FIGURE 13 is a fragmentary longitudinal section, showing the draw belts and the water sealing means.

As seen in FIGURE 12, the water level 61, is held near the top of the sleeve 50 where it is controlled by a conventional electrically operated water level controller. It will also be noted that the filament 49 is fed toward the tubing 20 as the belt 36 rides over the block 34, and the tubing 20 and filament 49 are moving at substantially the same speed. The filament 49 comes in contact with the butt joint 21 of the tube 20 just inside the sleeve 50 where it is lightly pressed in molten condition against the abutting edges of the tubing. The filament 49 continues to travel with the belt 36 and the tubing 20 until it is immersed in the water where it is suddenly chilled to form the finished bead for the tubing just before the belt 36 passes over the pulley 35.

Figure 14:
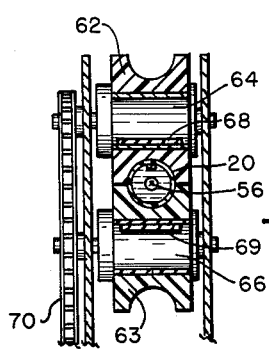
FIGURE 14 is a fragmentary cross section in elevation showing the draw belts and taken on the line 14—14 of FIGURE 3.

The means for continuously drawing and moving the tubing material from the supply roll 24 is shown in FIGURES 13 and 14. The draw belts 62 and 63 are composed of a plurality of segments 62a 62b, 63c . . . etc. and 63a, 63b, 63c . . . etc., respectively. These segments have a semi-circular cut-out so that the belts can frictionally engage the tubing and draw the material through the entire machine from the supply roll. The segments are made of a material which will create sufficient friction but will not absorb large quantities of water. Materials such as polyurethane or a closed cell rubber foam have been found satisfactory. The belts 62 and 63 are mounted on the pulleys 64–65 and 66–67. The belts are held against the tubing by the dead plates 68 and 69, and are positively driven from a source (to be described in greater detail hereinafter) which drives the chain 70 in FIGURE 14 engaging sprockets on the common shafts with the pulleys 64 and 66.

Figure 15:
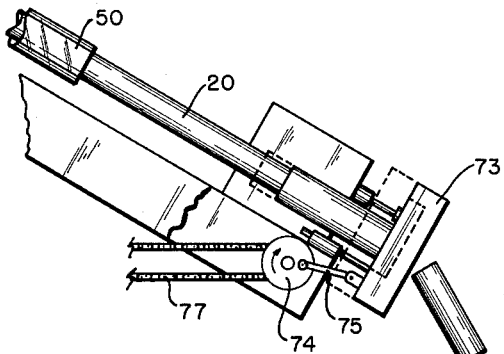
FIGURE 15 is a fragmentary elevation showing the sensing device and tube cutter.
Figure 16:
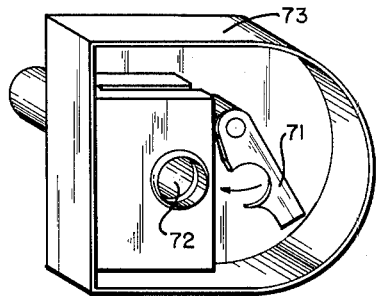
FIGURE 16 is a perspective view of the device used to cut the finished tubing into predetermined lengths.

The tubing 20 is then fed to a cut-off device which cuts the tubing into predetermined lengths. As shown in FIGURES 15 and 16, the cut-off mechanism is composed of a rotating knife 71 which cuts the tubing issuing continuously from the orifice 72. The knife 71 is mounted on a frame 73 which reciprocates due to the action of the crank 74 and connecting rod 75. The crank 74 is rotated by the chain 77. The purpose of the reciprocating motion is to move the knife 71 forward at the same speed as the tubing at the moment of cut-off. This assures an essentially square cut and prevents momentarily stopping the motion of the tubing during the cutting operation. A conventional sensing device (not shown), such as an electric eye or the like, can be used to properly time the action of the cutting knife 71 with a timing mark (not shown) on the tubing 20 so that the cut lengths are properly made between any printed matter which may appear on the continuous length. The cut-off device with the exception of the reciprocating motion, is a commercial model IV Versa Cutter manufactured by Foster & Allen of Chatham, New Jersey.

Figure 17:
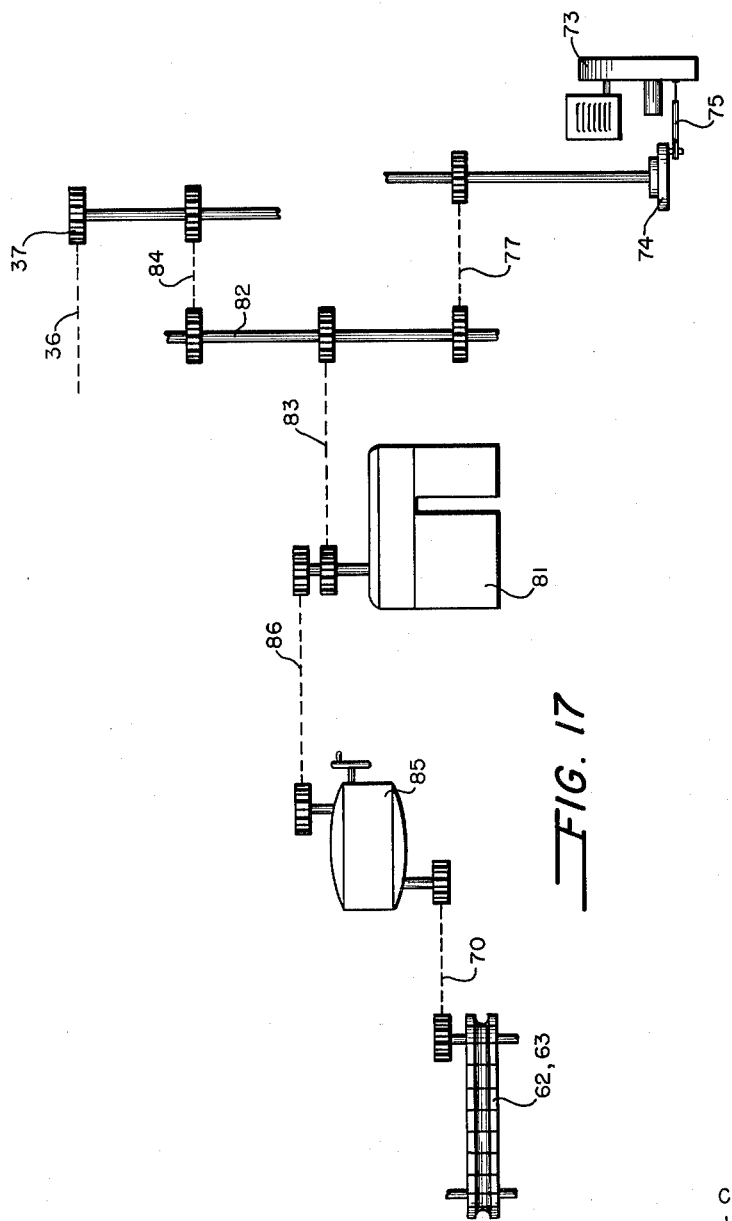
FIGURE 17 is a schematic view of the drive for the various operating components.

FIGURE 17 shows a schematic drive arrangement for the various elements of the machine. A commercial variable speed motor drive 81 drives the shaft 82 through the chain 83. The metal belt drive pulley 37 is driven from the shaft 82 by the chain 84. The draw belts 62 and 63 are also directly driven from the motor 81 through a conventional variable speed device 85 and the chains 86 and 70. The variable speed drive 85 is used to permit adjustment of the speed of the draw belts relative to the metal belt 36. It will also be noted that the shaft 82 drives the crank 74 to the cutter in proper timed sequence through the chain 77. Thus it will be apparent that the machine is operated continuously by the motor 81 and the various operating components are each driven in proper timed relationship from this central source of power.

While particular embodiments of the invention have been illustrated and described, it will be obvious to those skilled in the art that various changes and modifications can be made without departing from the spirit and scope of the invention and it is intended to cover in the appended claims all such changes and modifications that are within the spirit and scope of this invention.

What is claimed as new is:

1. Apparatus for continuously forming tubing from a web of flat stock comprising a metallic foil material having a heat sealable thermoplastic coating, said apparatus comprising, means for feeding said web of flat stock lengthwise at a predetermined linear speed, means for forming the flat stock during lengthwise feeding thereof into a tubular form so that the edges of the web of flat stock are formed into a butt joint and the heat sealable thermoplastic coating is on the inside of the tubular form, said means for forming the flat stock into tubular form including an internal forming mandrel, an endless belt having one end supported inside said internal forming mandrel and driven at substantially the same linear speed and having its upper flight driven in the same direction as the direction of movement of the tubular form, a sleeve surrounding the web material after its formation into tubular form, means for depositing a molten filament of thermoplastic material on said belt, said molten filament of thermoplastic material being heat sealable and compatible with said heat sealable thermoplastic coating, means for pressing said molten filament on said belt against the heat sealable butt joint of the tubing so that the filament is bonded to the heat sealable coating on both sides of the butt joint, and means for chilling said filament after it is adhered to the heat sealable coating on both sides of said butt joint to solidify the filament and complete the formation of tubing having a butt joint with an internal seam.

2. Apparatus as claimed in claim 1 including means for cutting the tubing into predetermined lengths.

3. Apparatus as claimed in claim 1 including means for forming a liquid lubricating film between the sleeve surrounding the tubing and the formed tubing.

4. Apparatus as claimed in claim 1 in which the means for chilling the molten filament includes means for feeding a liquid coolant inside the tubing and dam means engaging the periphery of the inside surface of the tubing for retaining the liquid within the tubng at a predetermined level.

References Cited by the Examiner
UNITED STATES PATENTS

| 2,169,936 | 8/39 | Wagner | 156—466 XR |
| 2,578,664 | 12/51 | Beery et al. | 156—200 XR |
| 2,914,108 | 11/59 | Coakley | 156—466 XR |
| 2,934,130 | 4/60 | Lane et al. | 156—463 |
| 2,941,570 | 6/60 | Plym | 156—466 XR |
| 3,008,863 | 11/61 | Morris et al. | 156—578 XR |
| 3,066,063 | 11/62 | Ecklund et al. | 156—200 |
| 3,066,721 | 12/62 | Levy | 156—200 XR |
| 3,070,274 | 12/62 | Elam | 229—48 |

FOREIGN PATENTS 736,018   8/55   Great Britain.

OTHER REFERENCES

Modern Packaging, "The Molten Bead Sealer," December 1956, pp. 153–156.

EARL M. BERGERT, *Primary Examiner.*